United States Patent [19]

Mito

[11] 4,002,402
[45] Jan. 11, 1977

[54] LENS HOOD FOR ZOOM LENSES

[76] Inventor: Hiroshi Mito, 527 Minaminakamaru, Omiya, Saitama, Japan

[22] Filed: Jan. 15, 1975

[21] Appl. No.: 541,204

[30] Foreign Application Priority Data

Feb. 27, 1974 Japan .............................. 49-23486

[52] U.S. Cl. .................................. 350/58; 350/187
[51] Int. Cl.² ..................... G02B 7/10; G03B 11/04
[58] Field of Search ............................ 350/58–60, 350/187

[56] References Cited

UNITED STATES PATENTS 3,765,748 10/1973 Mito .................................. 350/187

FOREIGN PATENTS OR APPLICATIONS 33,495 10/1971 Japan .................................. 350/187

Primary Examiner—David H. Rubin
Attorney, Agent, or Firm—Watson, Cole, Grindle & Watson

[57] ABSTRACT

A lens hood device is provided for a zooms lens system for preventing light rays during the zooming operation (from any point outside the field angle of the zoom lens system) from coming into the focusing lens component thereof when varying the field angle. The lens hood comprises a lens hood ring which is moved along the optical axis relative to a fixed lens barrel in conjunction with movement during the zooming operation of a zoom lens component also along the optical axis relative to the fixed lens barrel. Also, the lens hood is capable of moving along the optical axis relative to the fixed lens barrel together with movement of the focusing lens along the optical axis relative to the fixed lens barrel during the focusing operation.

2 Claims, 2 Drawing Figures

LENS HOOD FOR ZOOM LENSES

BACKGROUND OF THE INVENTION

Field of the Invention

This invention relates generally to a zoom lens apparatus having a lens hood, and more particularly to such a zoom lens apparatus wherein the lens hood comprises a lens hood ring connected to an operating ring of the apparatus and is capable of movement along the optical axis together with similar movement of a zoom lens component, during the zooming operation, and is further capable of such movement together with similar movement of a focusing lens during the focusing operation.

In zoom lens devices the field angle is normally varied by moving the zoom lens component along the optical axis during the zooming operation. Regardless of the manner in moving the lens, such devices should be equipped with a lens hood ring movable along the optical axis relative to the fixed lens barrel or fixed frame of the device. And, depending on the field angle selected in the zoom lens system, it is important that the lens hood ring be movable along the optical axis relative to the fixed lens barrel in conjunction with movement of the focusing lens component during the focusing operation so as to prevent light rays (from any point outside the field angle) from coming into the focusing lens component.

SUMMARY OF THE INVENTION

An object of the present invention is to provide a lens hood device for a zoom lens system in such a manner that, depending on the field angle and the photographic distance selected in response to the zooming operation and the focusing operation, light rays from any point outside the field angle are prevented from coming into the focusing lens component of the lens system.

Another object of this invention is to provide a lens hood device for a zoom lens system wherein the zooming operation and the focusing operation can be easily effected by a single operating ring and, as to the field angle and the photographic distance selected in the lens system, light rays from any point outside the field angle are prevented from coming into the focusing lens component by means of a lens hood comprising a ring which is movable along the optical axis, the field angle and the photographic distance selected being indicated by such ring.

A further object of the present invention is to provide a lens hood device for a zoom lens system including a single operating ring rotated and movable along the optical axis of the lens system relative to a fixed lens barrel and to which a lens hood ring is fixed, a zoom ring for effecting the zooming operation by movement along the optical axis together with movement along the optical axis of the operating ring relative to the fixed lens barrel, and a focusing operating ring for effecting the focusing operation by rotation thereof relative to the fixed lens barrel, whereby during the focusing operation the operating ring moves in the same direction relative to the fixed lens barrel in substantially the same amount as the movement of the focusing component along the optical axis relative to the fixed lens barrel.

In order to attain these objects, the present invention includes a lens hood device for a zoom lens system having an image forming lens component fixedly mounted to a fixed barrel, a zoom lens component mounted on a frame movable along the optical axis of the lens but not rotatable about the fixed lens barrel, and a focusing lens component fixed to a frame movable along the optical axis thereof but not rotatable thereabout. A pin is located on the zoom lens component frame for engagement with a cam slot formed on a cam ring rotatable at a fixed position on the optical axis relative to the fixed lens barrel. A zoom operating ring is disposed for movement along the optical axis to thereby effect rotation of the cam ring, but is otherwise not rotatable relative to the fixed lens barrel. An operating ring is connected to the zoom operating ring by means of a first helicoid engagement, is rotatable relative to the fixed lens barrel, and is movable along the optical axis. A focusing operating ring is so disposed that the axial movement of the operating ring is not transmitted thereto although the rotary motion thereof is so transmitted, such focusing operating ring being rotatable via a second helicoid engagement formed between it and the fixed lens barrel so as to be movable along the optical axis, the focusing operating ring threadedly engaging the frame of the focusing lens component via a third helicoid engagement. Furthermore, a lens hood comprising a lens hood ring is fixed to the operating ring.

When the operating ring is moved along the optical axis relative to the fixed lens barrel, movement thereof is not transmitted to the focusing operating ring, and only the zoom operating ring is moved along the optical axis. Accordingly, axial movement of the zoom operating ring rotates the cam ring to move the zoom lens component along the cam slot thereof and along the optical axis relative to the image forming lens component to thereby effect the zooming operation of the lens system. In other words, when the operating ring is moved in a forward direction (to the left in the drawings) relative to the fixed lens barrel, the zoom lens is varied to the Tele side and the field angle thereof becomes smaller, so that in response to these operations the lens hood ring also is moved forwardly to prevent any rays from outside the field angle from coming into the focusing lens component. And, when the operating ring is moved in a rearward direction the zoom lens system is varied to the Wide side and the field angle thereof becomes larger, so that in response to these operations the lens hood ring is moved rearwardly relative to the focusing lens component.

Whereas rotation of the operating ring is not transmitted to the zoom operating ring via the first helicoid engagement, slight rotation of the operating ring relative to the fixed lens barrel effects axial movement of the zoom operating ring to an extent depending on the pitch of the first helicoid. On the other hand, rotation of the operating ring is transmitted to the focusing operating ring to rotate it, the focusing operating ring is slightly moved axially relative to the fixed lens barrel by means of the second helicoid, and the axial movement thereof slightly moves the focusing lens component frame along the optical axis via a third helicoid without rotating the focusing lens component frame to thereby effect the focusing.

Except when photographing at a very short photographic distance, the moving distance along the optical axis of the focusing lens component is small. However, by approximately equalizing the pitches of the first helicoid and the second helicoid it is possible to move the lens hood ring forwardly and rearwardly along the optical axis so as to substantially correspond with the forward and rearward movements along the optical axis of the focusing lens component frame. And, depending on the field angle and the photographic distance selected in the zoom lens system, light rays from outside the field angle can be effectively prevented from coming into the focusing lens component by means of the lens hood.

DESCRIPTION OF THE PREFERRED EMBODIMENT

Figure 1:
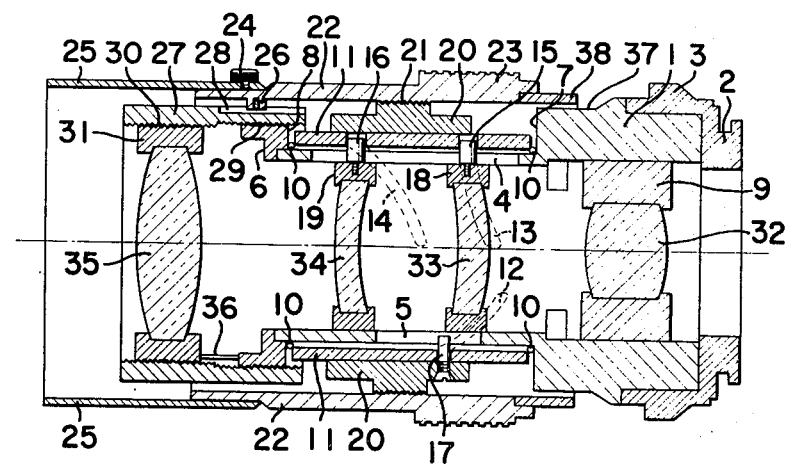
FIG. 1 is a longitudinal sectional view showing one embodiment in accordance with the present invention.
Figure 2:
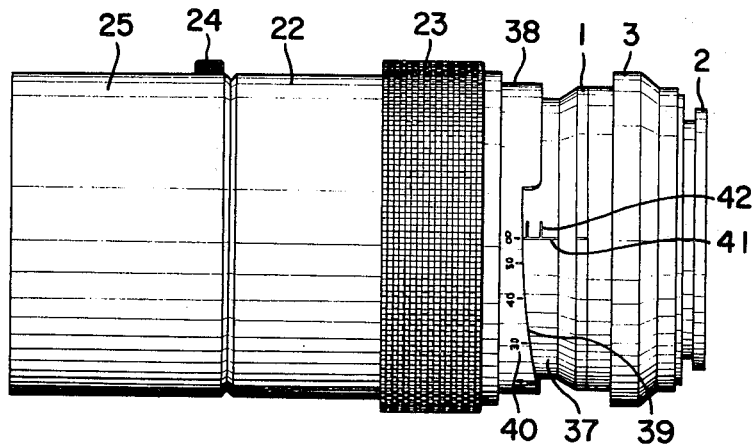
FIG. 2 is a side elevational view of the same embodiment.

With reference to FIGS. 1 and 2 illustrating one embodiment in accordance with the present invention, shown in detail in FIG. 1 are the elements of a lens system having some similarity to the first embodiment disclosed in U.S. Pat. No. 3,765,748 and commonly owned herewith. The present lens system includes a fixed lens barrel 1 provided at its rearward end with a fitting portion 2 for mounting on a photographic camera, motion picture camera or television camera. An operating portion 3 is formed on the periphery of barrel 1 for mounting the barrel onto such camera. The fixed lens barrel has a small diameter portion extending forwardly from shoulder portion 7 and a screw ring 6 is fixed at its forward end. This ring 6 has a rearward end face 8 and a second helical portion 29 to be more fully described hereinafter.

Through slots 4 and 5 are provided in the small diameter portion of the fixed lens barrel, such slots lying parallel to the longitudinal and optical axes of the lens system. Also, a frame 9 is fixedly mounted in place within the barrel for supporting an image forming lens 32.

A cam ring 11 is disposed about the small diameter portion of the fixed lens barrel 1 and is prevented from moving axially relative to the barrel by means of shoulder portion 7 and end face 8. Ball bearings 10 may be disposed at opposite ends of ring 11 as shown in FIG. 1. Also, cam ring 11 has three cam slots 12, 13 and 14 located therein.

A zoom operating ring 20, loosely fitted about the periphery of cam ring 11, has first helicoid portion 21 formed on its periphery, and has an inwardly extending pin 17 on its circumference which extends through cam slot 12 of cam ring 11 so as to lie within and engage slot 5 located on the small diameter portion of the fixed lens barrel.

A frame 18, movably disposed within the small diameter portion of the fixed lens barrel, supports a compensating lens component 33, and a radially extending pin 15 on its periphery extends through axial slot 4 so as to lie within and engage cam slot 13 of the cam ring.

A frame 19, movably disposed within the barrel in a manner similar to frame 18, is disposed forwardly of lens 33 and supports a zoom lens component 34. A radially extending pin 16 on the periphery of frame 19 extends through axial slot 4 so as to lie within and engage cam slot 14 of the cam ring.

An operating ring 22 meshes with first helicoid portion 21 of zoom operating ring 20, and has a ring-shaped operating portion 23 on its periphery. A rearward end 38 of ring 22 is disposed loosely about a surface 37 of the fixed lens barrel, and a lens hood ring 25 constituting the lens hood for the system is detachably secured to the forward end of ring 22 by means of a screw 24. Also, an inwardly projecting pin or guide element 26 is provided near the forward end of ring 22.

A focusing operating ring 27, having a rearward helicoid portion on its inner surface, meshes with second helicoid portion 29 formed on the outer surface of screw ring 6 which is secured to the forward end of the fixed lens barrel. An axial groove 28 is located on the outer surface of ring 27 for the reception of pin 26, and a third helicoid portion 30 is formed at the forward inner surface of ring 27. Also, a frame 31, disposed within ring 27, has a helicoid portion in meshing engagement with third helicoid portion 30. Frame 31 supports a focusing lens component 35, and rotation of this frame relative to barrel 1 is prevented while axial movement thereof is permitted via helicoid portion 30.

As shown in FIG. 2, a cam-shaped edge portion 39 is located at the rearward end of element 38 which also has a graduated photographic distance scale 40 on its outer surface. Also, a graduated line 41 serving as an index and a scale 42 for showing the extent of zooming of the zoom lens system, are provided on surface 37.

In accordance with the above-described embodiment, when operating ring 22 is moved along the optical axis relative to fixed lens barrel 1, its guide element or pin 26 moves only along groove 28 of focusing operating ring 27 so that such movement of ring 22 is not transmitted to focusing ring 27. No movement of focusing lens component 35 therefore takes place. However when operating ring 22 is moved axially zoom operating ring 20 is likewise moved along the optical axis, and axial movement of pin 17 therefore effects rotation of cam ring 11 since pin 17 is engaged with cam slot 12. Therefore, compensating lens component frame 18 and zoom lens component frame 19, which are respectively prevented from rotating by means of pins 15 and 16 in engagement with axial slot 4, are moved along the optical axis relative to image forming lens component 32 to effect this zooming operation of the zoom lens system.

When operating ring 22 is moved forwardly (to the left in the Figures) the zoom lens system is zoomed to the Tele side, and when operating ring 22 is moved rearwardly (to the right in the Figures) the zoom lens system is zoomed to the Wide side. When the field angle of the zoom lens system is varied to the Tele side or to the Wide side in response to such zooming, lens hood ring 25 is moved forwardly or rearwardly together with operating ring 22 to prevent light rays from any point outside the field angle from coming into focusing lens component 35 to cause a halation. Cam-shaped end edge 39 of operating ring 22 shows the extent of zooming through scale 42.

On the other hand, when operating ring 22 is rotated without being shifted axially in either direction along the optical axis, operating ring 22 is slightly moved along the optical axis relative to the fixed lens barrel by means of first helicoid portion 21, although zoom operating ring 20 is not moved along the optical axis relative to the fixed lens barrel. Cam ring 11 is therefore not caused to be rotated and, accordingly, no zooming is effected. However, focusing operating ring 27 is rotated via pin 26 and slot 28 to move it together with focusing lens component frame 31 along the optical axis relative to image forming lens component 32 by means of second helicoid portion 29, therefore effecting the focusing of the entire zoom lens system for a desired photographic distance. In such manner, the rotation of focusing lens component frame 31 is prevented by means of a pin 36 which engages openings (not shown) in both frame 31 and ring 6. Accordingly, zooming is not effected.

However, during movement of focusing lens component 35 along the optical axis, unless lens hood ring 25 is likewise moved along the optical axis, light rays from any point outside the field angle cannot be prevented from coming into the focusing lens component. However, by properly selecting the pitches of the first, second and third helicoid portions, as for example, if the pitch of the third helicoid portion is made very small and the pitches of the first helicoid and the second helicoid portions are made approximately equal, during rotation of operating ring 22 it is moved forwardly and rearwardly together with lens hood ring 25 substantially the same amount in response to slight movement of the focusing lens component along the optical axis. Light rays from any point outside the field angle, due to the lens hood, can thereby be prevented from coming into the focusing lens component to cause a halation, and concurrently distance scale 40 shows the photographic distance focused by means of index 41.

Although the present invention has been described in its preferred form with a certain degree of particularity, it is to be understood that the present disclosure of the preferred form may be changed in its construction details, and the combination and arrangement of parts may be changed without departing from the spirit and scope of the invention.

What is claimed is:

1. A lens hood device for a zoom lens system, comprising:
    a fixed lens barrel for supporting an image forming lens component;
    an operating ring rotatably mounted about the periphery of said fixed lens barrel, and further mounted for movement along the optical axis of said image forming lens component;
    a lens hood comprising a lens hood ring detachably secured to a forward end of said operating ring;
    a zoom operating ring threadedly engaged with said operating ring by a first helicoid portion for movement together with said operating ring along the optical axis, and being disposed against rotation relative to said fixed lens barrel;
    a cam ring mounted for rotation at a fixed position about the optical axis relative to said fixed lens barrel and being capable of rotation together with the movement of said zoom operating ring along the optical axis relative to said fixed lens barrel, said cam ring having a cam slot for effecting movement of a zoom lens component which is disposed against rotation relative to said fixed lens barrel along the optical axis, and said cam slot of said cam ring being so disposed as to move said zooming lens component along the optical axis relative to said image forming component so that said zooming lens system may be zoomed to the Tele side when said operating ring is moved forwardly along the optical axis relative to said fixed lens barrel;
    said lens hood ring being so disposed as to be capable of preventing light rays from any point outside the field angle in the zooming lens system during a zooming operation from coming into said focusing lens component when said operating ring is moved along the optical axis relative to said fixed lens barrel; and
    a focusing operating ring in threaded engagement with said fixed lens barrel by a second helicoid portion, said focusing operating ring being mounted for rotation together with said operating ring and a focusing lens component being supported by said focusing operating ring, whereby together with the rotation of said operating ring relative to said fixed barrel said first helicoid portion effects movement of said operating ring along the optical axis relative to said fixed lens barrel and concurrently said operating ring moves said focusing operating ring along the optical axis via the second helicoid portion, the pitch of said first and second helicoid portions being substantially equal whereby said focusing operating ring moves said focusing lens component along the optical axis relative to said fixed lens barrel and said operating ring moves said lens hood ring in the same direction along the optical axis by substantially the same amount as the amount said focusing lens component is moved.

2. A lens hood device for a zoom lens system as set forth in claim 1, wherein:
    said operating ring has a cam-shaped end edge at its rearward end;
    a scale disposed along said cam-shaped end edge to show the photographic distance focused;
    an index disposed on said fixed lens barrel corresponding to said cam-shaped end edge; and
    a scale disposed along said index to show the zoomed extent of the zooming lens system.

* * * * *